/ / / /
US009628800B2

(12) United States Patent
Hsieh et al.

(10) Patent No.: US 9,628,800 B2
(45) Date of Patent: Apr. 18, 2017

(54) ADAPTIVE CONTROL FOR TRANSFORMS IN VIDEO CODING

(71) Applicant: QUALCOMM Incorporated, San Diego, CA (US)

(72) Inventors: Cheng-Teh Hsieh, San Diego, CA (US); Feng Ge, San Diego, CA (US); Sumit Mohan, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 14/083,184

(22) Filed: Nov. 18, 2013

(65) Prior Publication Data

US 2015/0139331 A1 May 21, 2015

(51) Int. Cl.
| | |
|---|---|
| *H04N 19/12* | (2014.01) |
| *H04N 19/103* | (2014.01) |
| *H04N 19/107* | (2014.01) |
| *H04N 19/122* | (2014.01) |
| *H04N 19/70* | (2014.01) |
| *H04N 19/124* | (2014.01) |
| *H04N 19/157* | (2014.01) |

(52) U.S. Cl.
CPC .......... *H04N 19/12* (2014.11); *H04N 19/103* (2014.11); *H04N 19/107* (2014.11); *H04N 19/122* (2014.11); *H04N 19/124* (2014.11); *H04N 19/157* (2014.11); *H04N 19/70* (2014.11)

(58) Field of Classification Search
CPC .... H04N 19/12; H04N 19/103; H04N 19/107; H04N 19/122; H04N 19/124; H04N 19/157; H04N 19/70

USPC ..................................................... 375/240.18
See application file for complete search history.

(56) References Cited

U.S. PATENT DOCUMENTS

| | | | | |
|---|---|---|---|---|
| 6,310,981 | B1* | 10/2001 | Makiyama | H04N 21/235 |
| | | | | 375/E7.012 |
| 2012/0008675 | A1 | 1/2012 | Karczewicz et al. | |
| 2012/0057630 | A1 | 3/2012 | Saxena et al. | |
| 2012/0082212 | A1 | 4/2012 | Sadafale et al. | |
| 2012/0082232 | A1 | 4/2012 | Sole et al. | |
| 2013/0022128 | A1 | 1/2013 | Symes | |
| 2013/0034170 | A1* | 2/2013 | Chen | H04N 13/00 |
| | | | | 375/240.25 |
| 2014/0269934 | A1* | 9/2014 | Haque | H04N 19/597 |
| | | | | 375/240.25 |

(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

In an example, a method of transforming video data comprises determining, based on variable operational code, a plurality of control parameters for transforming the video data in a transform domain, wherein the operational code maps each of the plurality of control parameters to respective operational code fields, and performing transformation of the video data based on the determined control parameters.

16 Claims, 6 Drawing Sheets

(56) References Cited

U.S. PATENT DOCUMENTS

2015/0139331 A1* 5/2015 Hsieh .................. H04N 19/122
                                                                                  375/240.18

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pages.

ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

* cited by examiner

ADAPTIVE CONTROL FOR TRANSFORMS IN VIDEO CODING

TECHNICAL FIELD

This disclosure relates to video coding, and more particularly to techniques for performing transformation when coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

Techniques of this disclosure generally relate to transformation of video data in a video coding process. The techniques of this disclosure provide an adaptive approach to generating and using control parameters in a transformation engine. For example, according to aspects of this disclosure, a transformation engine may use a variable operational code ("op-code") to determine control parameters for applying transforms in video coding. The op-code provides flexibility and may be modified to accommodate a variety of video coding standards and/or coding conditions.

In an example, a method of transforming video data comprises determining, based on variable operational code, a plurality of control parameters for transforming the video data in a transform domain, wherein the operational code maps each of the plurality of control parameters to respective operational code fields, and performing transformation of the video data based on the determined control parameters.

In another example, an apparatus for transforming video data comprises one or more processors configured to determine, based on variable operational code, a plurality of control parameters for transforming the video data in a transform domain, wherein the operational code maps each of the plurality of control parameters to respective operational code fields, and perform transformation of the video data based on the determined control parameters.

In another example, a non-transitory computer-readable medium stores instructions that, when executed, cause one or more processors to determine, based on variable operational code, a plurality of control parameters for transforming the video data in a transform domain, wherein the operational code maps each of the plurality of control parameters to respective operational code fields, and perform transformation of the video data based on the determined control parameters.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
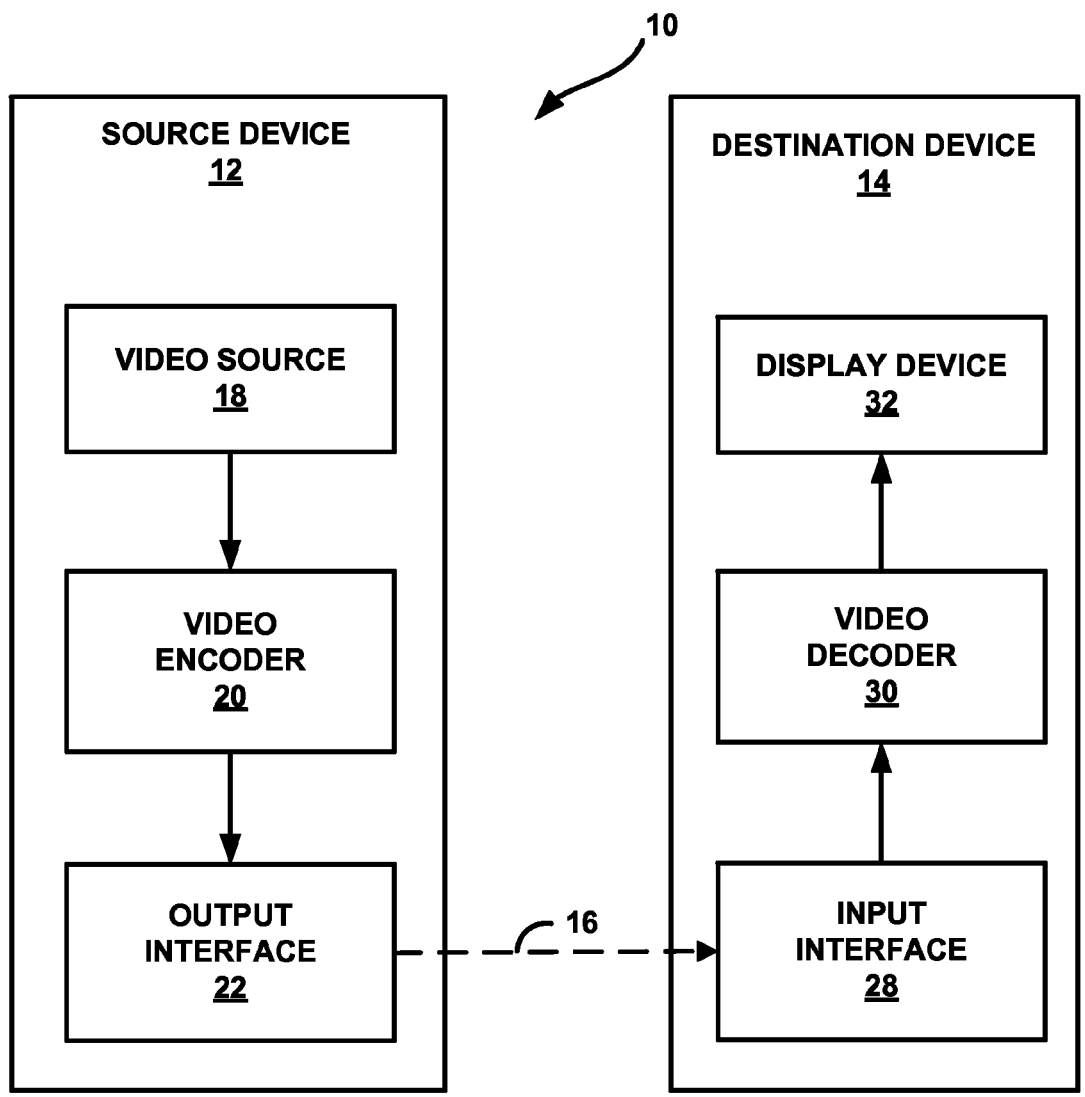
FIG. 1 is a block diagram illustrating an example video encoding and decoding system that may implement the techniques of this disclosure.

A video coding device (e.g., a video encoding device or a video decoding device) may achieve video compression by applying spatial (intra-frame) prediction and/or temporal (inter-frame) prediction techniques to reduce or remove redundancy inherent in video sequences. For example, the video coder may derive a predictor either through intra (I) prediction (i.e. spatial prediction) or inter (P or B) prediction (i.e. temporal prediction). Upon identification of a predictor, the video coder may determine the difference between the original video data block and its predictor. This difference may be referred to as the prediction residual, and indicates pixel differences between the block to be coded and the reference block, i.e., the predictor.

To achieve better compression, the prediction residual is generally transformed by applying a transform (a discrete cosine transform (DCT), integer transform, Karhunen-Loeve (K-L) transform, or other transform). The transform converts pixel difference values in the spatial domain to transform coefficients in the transform domain, e.g., a frequency domain.

Prediction residual typically includes luma samples (Y) together with corresponding chroma samples (Cb, Cr) for video data that has three sample arrays. As described in greater detail below, a transform unit may refer to a luma transform block and the two corresponding chroma transform blocks. The transform coefficients are normally arranged in a two-dimensional (2-D) array for each transform block in the transform unit. Accordingly, a video coder typically applies a 2-D transform to the prediction residual.

A video coder (e.g., such as a video encoder or video decoder) may apply transforms using a transform engine. In general, a transform engine may include processing units responsible for carrying out transformation, including one or more fixed function processing units. For example, a transform engine may typically include a plurality of datapaths (e.g., made up of one or more functional processing units such as multipliers, arithmetic units, or the like) for performing transformation. In some instances, the transform engine may also be responsible for other coding functions, such as quantization.

The transform engine may perform transformation operations (e.g., transformation or residual to transform coefficients, inverse transformation from transform coefficients to reconstructed residual data, quantization, inverse quantization, and the like) based on a variety of control parameters. For example, the transform engine may route video data to be transformed to a particular datapath of the transform engine based on the control parameters.

In general, control parameters may indicate one or more characteristics of the video data being transformed. For example, control parameters may include data identifying the block to be transformed, a transform size (e.g., from 2×2 to 32×32 or larger), color space information (e.g., luma, chroma, luma DC, chroma DC), a prediction mode (e.g., inter or intra), a type of transform (e.g., row or column transform), a direction of a transform (e.g., forward or inverse transform in instances in which the transform engine is responsible for applying both forward and reverse transforms), and the like. Other control parameters may include a parameter indicating the video coding standard being used to transform the video data, or one or more parameters indicating whether the transform engine must wait for other video coding processes to be completed prior to transforming a current block. It should be understood that the control parameters described above are provided for purposes of example only, and that other control parameters are also possible.

The transform engine (or another component of the video coder) typically generates control parameters using a finite state machine or other hard coded logic. In order to properly generate and use all of the different control parameters, logic for generating and using the different combinations of control parameters may be relatively complex. In addition, control parameters may be different for different video coding standards. For example, a block size control parameter for the ITU-T H.264 video coding standard (alternatively referred to as MPEG-4, Part 10, Advanced Video Coding (AVC)) (e.g., block sizes of 16×16 pixels) may be different than a block size control parameter for the High Efficiency Video Coding (HEVC) standard (e.g., variable block sizes from 4×4 pixels to 32×32 pixels). Accordingly, development of control parameter logic for a transform engine may be relatively computationally and/or time intensive. For example, when implementing a finite state machine, a number of different states may need to be validated prior to deployment in a video coder.

In addition, control parameter logic typically requires manual reconfiguration for new combinations of control parameters that accompany new and/or changing video coding standards or configurations, as well as different combinations of standards, because the control parameter logic is typically hard coded. For example, as noted above the HEVC standard allows for a wider variety of block sizes than the H.264/AVC video coding standard. Accordingly, a finite state machine of a transform engine for an H.264/AVC compliant video coder that determines a block size is not compatible with a finite state machine of a transform engine for an HEVC compliant video coder that determines a block size. As such, to the extent that video coders are hardwired and/or hardcoded to perform encoding or decoding based on a single individual standard, designing a video coder with standard coding techniques may typically lead to larger, more complex, hardwired configurations that may raise the costs for transform engine hardware design and configuration.

The techniques of this disclosure provide a variable or adaptive approach to generating and using control parameters in a transformation engine. For example, according to aspects of this disclosure, a transformation engine may use a variable operational code ("op-code") to determine control parameters for applying transforms in video coding. The op-code provides flexibility and may be modified to accommodate a variety of video coding standards and/or coding conditions.

In some examples, the transform engine may include a programmable front end that utilizes the op-code to determine the control parameters, as well as one or more back end fixed function hardware units (such as one or more application specific integrated circuits (ASICs), arithmetic logic units (ALUs), multiply-accumulate (MAC) units, or the like) for performing transformation operations on video data. The combination of the programmable front end and fixed function back end may strike a balance between flexibility and speed in a transform engine for video coding. For example, the programmable front end may include the flexibility to accommodate a variety of video coding standards/conditions with the op-code, while the fixed function back end may provide processing speed and/or efficiency for processing pixel data typically associated with fixed function hardware.

In an example, a video coder (video encoder and/or video decoder) may include a transform engine having a task memory. In some instances, the task memory may be configured as a reconfigurable, programmable memory, which may be referred to as a task RAM. In other instances, the task memory may be configured in a manner similar to a read-only memory (ROM), which may be referred to as a task look-up table (LUT). In any case, the task memory may store one or more variable operational codes, referred to herein as op-codes. Each op-code may map a plurality of control parameters to a plurality of op-code fields. For example, each op-code may include a string of op-code field values, with each op-code field value indicating a particular control parameter value.

In this example, the transform engine may collect control parameter values as a set of op-code, setting each control parameter value as an op-code field value of the op-code. For example, when receiving video data to be transformed with a transformation operation, the transform engine may determine that a transform size control parameter has a control parameter value of 4×4. The transform engine may set the transform size control parameter value as a three bit "001" op-code field value in an op-code. Thus, when performing the transformation operation, the transformation engine reads the "001" op-code field value associated with the size op-code field and determines that the size of the transform being applied is 4×4.

In some instances, the transform engine may order the op-code fields in a predetermined manner (e.g., transform type, followed by transform direction, followed by transform size, and the like). Thus, in an example for purposes of illustration, the transform engine may associate the first three bits of an op-code with a particular op-code field value (mapped to a particular control parameter and indicating a control parameter value), the next three bits of the op-code with another op-code field value, and so on.

In addition, the transform engine may arrange a plurality of op-codes according to an operational flow of transformation operations. That is, the transform engine may arrange the plurality of op-codes in the relative order in which the op-codes are to be executed. In some examples, the plurality of op-codes may be arranged according to relative timestamps associated with the transformation operations. For example, a unit of the transform engine responsible for scheduling transformation operations may schedule each operation based on an order in which the operation is to be executed. The process of arranging the operation in a processing order (e.g., based on an operation sequence) may be referred to as assigning each operation a timestamp. However, it should be understood that a "timestamp" may refer to either to an absolute time (e.g., based on a particular number of clock cycles) or a relative time (e.g., based on a relative operational flow), as described in greater detail with respect to, for example, FIG. 4 below.

In some examples, op-code field values associated with particular op-code fields may include more bits than necessary to represent control parameters of a particular standard. In an example for purposes of illustration, assume that a transform size parameter for the H.264/AVC standard may be represented with a two bit op-code field value. However, the transform size parameter for the HEVC standard may require three or more bits to represent transform size. Accordingly, according to aspects of this disclosure, the length of a particular op-code field may be selected to accommodate future expansion (for compliance with additional standards), but without being so long that the op-code fields become computationally burdensome. In this way, an op-code is adaptable to different standards without significant changes to the op-code structure.

The flexible approach described above may act as a programmable state machine, and may be reloaded and/or updated relatively easily. For example, op-code fields and field values may be changed with few or no changes to hardware associated with the transform engine. In addition, additional op-code fields and corresponding op-code field values may be added to conform to different standards, as well as not yet developed standards. The techniques may simplify costs associated with design and verification of transform engines. For example, if an error is detected during a design phase, the contents of the task memory (storing the mapping between control parameters and op-code) may be easier to modify than a hardware-based state machine. Moreover, different combinations of the control parameters are relatively easily added and verified, which may benefit chip re-spin for a new or changing standard.

FIG. 1 is a block diagram illustrating an example video encoding and decoding system 10 that may utilize techniques for performing transformation in video coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing transformation may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, or other protocols such as the user datagram protocol (UDP).

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

The JCT-VC recently developed the HEVC standard. A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013. While the techniques of this disclosure are not limited to any particular coding standard, the techniques may be relevant to the HEVC standard.

In general, with respect to HEVC, a picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

The transform coefficients are normally arranged in a 2-D array for each transform block (e.g., Y block, Cr block Cb block, although other colorspaces are also possible) of a TU. Accordingly, video encoder 20 typically applies a 2-D transform for each transform block when transforming prediction residual. Video encoder 20 may apply the 2-D transform in two stages. For example, video encoder 20 may apply a horizontally oriented first stage to prediction residual, followed by a vertically oriented second stage to the result of the first stage (or vice versa).

Video encoder 20 may apply transforms using one or more processing units responsible for carrying out transformation, referred to herein as a transform engine. In some instances, as described in greater detail below with respect to FIGS. 2 and 3, the transform engine may be tightly integrated with one or more other units, such as a quantization unit responsible for performing quantization (or de-quantization) of transform coefficients.

Video encoder 20 may use a variety of control parameters to determine the manner in which to apply transforms, e.g., to a TU of video data. As noted above, control parameters may indicate one or more characteristics of the video data being transformed. For example, control parameters may include data identifying the block to be transformed, a transform size (e.g., from 2×2 to 32×32 or larger), color space information (e.g., luma, chroma, luma DC, chroma DC), a prediction mode (e.g., inter or intra), a type of transform (e.g., row or column transform), a direction of a transform (e.g., forward or inverse transform in instances in which the transform engine is responsible for applying both forward and reverse transforms), and the like. Other control parameters may include the video coding standard being used to transform the video data, or whether video encoder 20 must wait for a video coding process to be completed prior to transforming a current block. It should be understood that the control parameters described above are provided for purposes of example only, and that other control parameters are also possible.

Video encoder 20 typically generates control parameters using a finite state machine or other hard coded logic. As the number and/or combinations of control parameters rises, such logic may be relatively complex and may be relatively difficult to develop. In addition, such hard coded control parameter logic typically requires reconfiguration for new combinations of control parameters that accompany new and/or changing standards.

The techniques of this disclosure provide an adaptive approach to generating and using control parameters for transformation. According to aspects of this disclosure, video encoder 20 may determine, based on variable operational code (referred to as op-code), a plurality of control parameters for transforming video data in a transform domain (e.g., transforming residual video data to transform coefficients). According to the techniques of this disclosure, the op-code maps each of the plurality of control parameters to respective op-code fields. Video encoder 20 may then perform transformation of the residual video data based on the determined control parameters.

According to aspects of this disclosure, op-code fields and op-code field values may be changed with few or no changes to hardware associated with video encoder 20. In addition, additional op-code fields and op-code field values may be added to conform to different standards, as well as not yet developed standards. In this way, the techniques may simplify costs associated with design and verification of hardware associated with video encoder 20 for performing transformation.

In an example, video encoder 20 may determine control parameter values associated with video data, such as a block of video data. In some instances, the control parameter values for the block may be indicated during the coding process. For example, video encoder 20 may set one or more syntax elements in a bitstream indicating a particular control parameter value when coding the block.

Video encoder 20 may use such indications to determine the control parameters for a block prior to performing transformation operations on the block. Video encoder 20 may then set each determined control parameter value as an op-code field value of the op-code. Video encoder 20 may store the op-code to memory, which may be referred to as a task RAM or look-up table (LUT). In this way, video encoder 20 maps each control parameter to an op-code field of the op-code.

In some instances, video encoder 20 may order the op-code fields in a predetermined manner (e.g., transform type, followed by transform direction, followed by transform size, and the like). Thus, in such instances, each op-code field may be associated with a predetermined position in the op-code relative to each other op-code field. In addition, video encoder 20 may arrange a plurality of op-codes according to an operational flow of transformation operations, e.g., using relative or absolute timestamps associated with the transformation operations.

According to some aspects of this disclosure, video encoder 20 may include a transform engine that performs the techniques described above. In such examples, the transform engine of video encoder 20 may include a programmable front end that utilizes the op-code described above to determine the control parameters, as well as one or more back end fixed function hardware units (such as one or more ASICs, ALUs, MACs, or the like) for performing transformation operations on video data. The combination of the programmable front end and fixed function back end may strike a balance between flexibility to accommodate different and/or new video coding standards and processing speed/efficiency.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, transformation and quantization may be tightly integrated, such that video encoder 20 performs both transformation and quantization with the transform engine described above. In such examples, video encoder 20 may use an op-code to determine control parameters for performing quantization. That is, an op-code may map one or more quantization control parameters to one or more op-code fields.

Video encoder 20 may then scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon receiving the coded video data, may perform a decoding pass generally reciprocal to the encoding pass described with respect to video encoder 20. According to aspects of this disclosure, for example, video decoder 30 may perform transformation in a similar manner as described above with respect to video encoder 20.

For example, according to aspects of this disclosure, video decoder 30 may determine, based on a variable op-code, a plurality of control parameters for transforming video data in a transform domain (e.g., inverse transforming transform coefficients to form reconstructed residual data). According to the techniques of this disclosure, the op-code maps each of the plurality of control parameters to respective op-code fields. Video decoder 30 may then perform transformation of the video data based on the determined control parameters.

Thus, while the transformation process described above is described with respect to forward transformation (e.g., transformation of residual values to the transform domain), it should be understood that similar techniques are applicable to inverse transforms (e.g., transformation of transform coefficients to residual values) as applied be video decoder 30. Accordingly, video decoder 30 may perform the transformation techniques of this disclosure to inverse transform parsed transform coefficients from an encoded bitstream to residual values.

In an example, video decoder 30 may determine control parameter values associated with video data, such as a block of video data. In some instances, the control parameter values for the block may be indicated during the coding process. For example, video decoder 30 may receive one or more syntax elements in an encoded bitstream indicating a particular control parameter value when coding the block.

Video decoder 30 may use such indications to determine the control parameters for a block prior to performing transformation operations on the block. Video decoder 30 may then set each determined control parameter value as an op-code field value of the op-code. Video decoder 30 may store the op-code to memory, which may be referred to as a task RAM or look-up table (LUT). In this way, video decoder 30 maps each control parameter to an op-code field of the op-code.

Accordingly, as described above with respect to video encoder 20, op-code fields and op-code field values may be changed with few or no changes to hardware associated with video decoder 30. In addition, additional op-code fields and op-code field values may be added to conform to different standards, as well as not yet developed standards. In this way, the techniques may simplify and reduce costs associated with design and verification of hardware associated with video decoder 30 for performing transformation.

Figure 2:
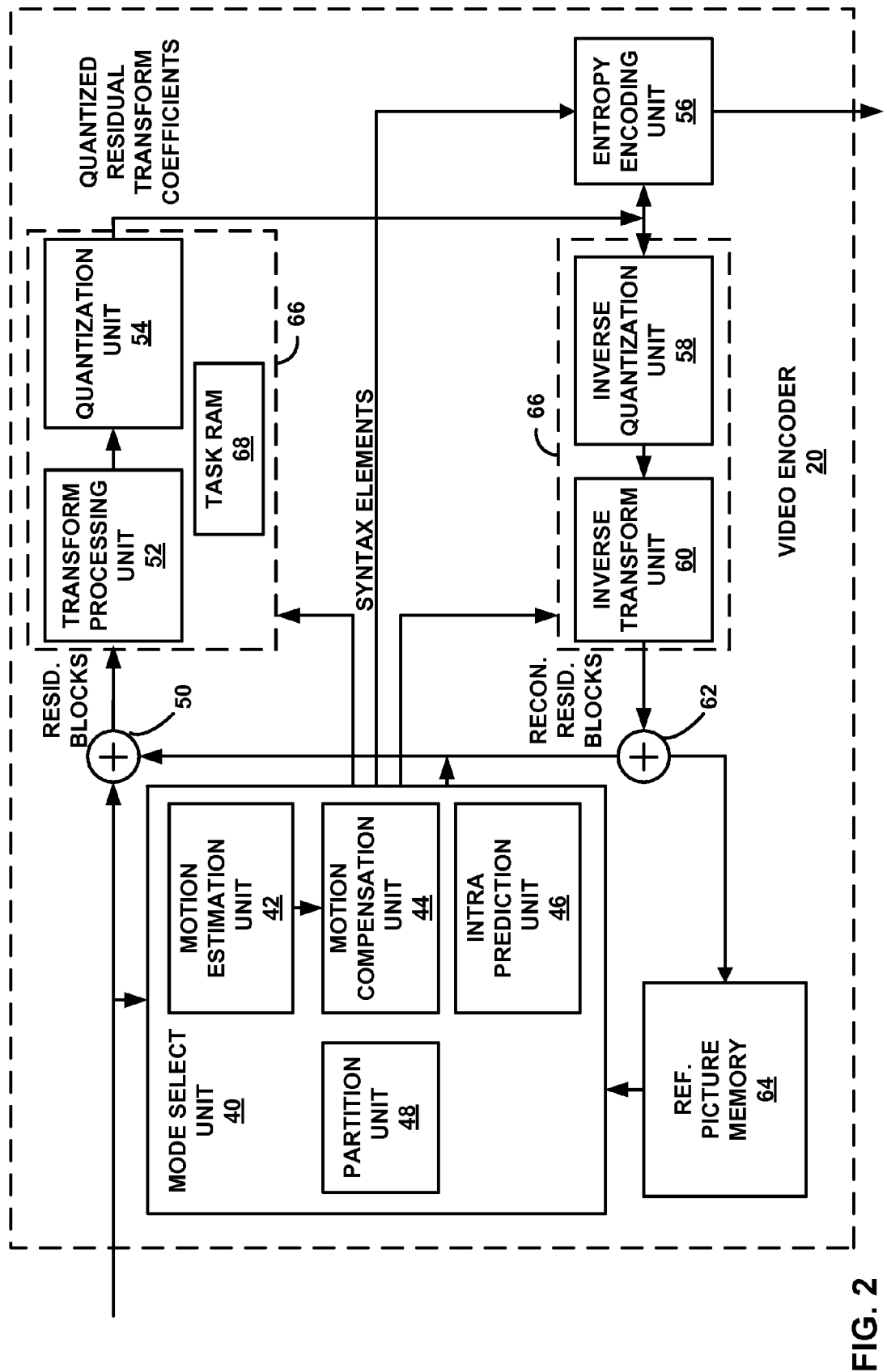
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards or methods that may require scanning of transform coefficients.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives a current video block within a video picture to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

In the example of FIG. 2, video encoder 20 also includes transform engine 66, which includes transform processing unit 52, quantization unit 54, inverse quantization unit 58, and inverse transform unit 60 (illustrated using a dashed line) as well as task RAM 68. Thus, while each of transform processing unit 52, quantization unit 54, inverse quantization unit 58, and inverse transform unit 60 is shown as a separate unit, it should be understood that such units may be highly integrated, and may be included in the same processing unit. In other examples, transform engine 66 may include more or fewer units than those shown in FIG. 2. For example, in another example, transform engine 66 may include only transform processing unit 52, inverse transform unit 60, and task RAM 68 and may be responsible only for applying forward and inverse transforms.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. According to aspects of this disclosure, inverse transform unit 60 may apply an inverse of the process described above with respect to transform processing unit 52 to generate residual values from transform coefficients.

According to aspects of this disclosure, transform engine 66, shown as including transform processing unit 52, quantization unit 54, inverse quantization unit 58, and inverse transform unit 60, may perform techniques of this disclosure. For example, according to aspects of this disclosure, transform engine 66 may use a variable op-code to determine control parameters for applying transforms and or quantization.

In the example of FIG. 2, transform engine 66 includes a memory, which may be referred to as task RAM 68. While illustrated as a separate memory unit in the example of FIG. 2, in other examples, task RAM 68 may be allocated in a shared memory for video encoder 20. In any case, as described in greater detail with respect to FIG. 4 below, task RAM 68 may store one or more op-codes, each of which map of a plurality of control parameters to a plurality of op-code fields. For example, an op-code may be referred to as mapping control parameters to op-code fields, because the op-code includes a plurality of op-code fields, each of which have a predetermined association with a particular control parameter.

According to aspects of this disclosure, transform engine 66 may collect control parameter values as a set of op-code, setting each control parameter value as an op-code field value of the op-code. For example, transform engine 66 may receive an indication of a particular control parameter value (e.g., data identifying the block to be transformed, a transform size, color space information, a prediction mode, a type of transform, a direction of a transform, or the like) from another unit of video encoder 20, such as mode select unit 40, motion estimation unit 42, motion compensation unit 44, intra predication unit 46, partition unit 48, or one or more other units of video encoder 20. Such indications may be received in the form of one or more syntax elements.

As an example, transform engine 66 may determine that a transform size control parameter has a control parameter value of 4×4. Transform engine 66 may set the transform size control parameter value as a three bit "001" op-code field value in an op-code. Thus, when performing transformation, transform engine 66 may read the "001" op-code field value associated with the size op-code field and determine that the size of the transform being applied to the block is 4×4. In response, transform engine 66 may apply an appropriately sized transform based on the op-code.

In some instances, transform engine 66 may store op-code field values to task RAM 68 in a predetermined order (e.g., transform type field, followed by transform direction field, followed by transform size field, and the like). Thus, in an example for purposes of illustration, transform engine 66 may associate the first three bits of an op-code with a particular op-code field value, the next three bits of the op-code with another op-code field value, and so on when executing an op-code. In this example, each op-code field may be associated with a predetermined position in the op-code relative to each other op-code field. In other examples, transform engine 66 may vary the ordering of op-code fields based on the data being transformed, e.g., based on the op-code fields that are needed for a particular block or slice of video data.

In some examples, transform engine 66 may organize op-codes according to a flow of operations. For example, transform engine 66 may determine a relative or absolute time at which to perform each operation (e.g., applying a forward transform to a block of residual data) and assign a task order to each transformation operation. In addition, transform engine 66 may generate an op-code for each transformation operation and link each op-code to the appropriate task. In this way, transform engine 66 may chronologically arrange op-codes according to the time at which the op-codes are to be executed.

In some examples, transform engine 66 may use op-code field lengths (e.g., bit string lengths) that include more bits than necessary to represent control parameters of a particular standard. For example, the length of a particular op-code field may be selected to accommodate future expansion (for compliance with additional standards), but without being so long that the op-code fields become computationally burdensome. In this way, transform engine 66 is adaptable to different standards, such as current video coding standards or video coding standards not yet developed, without significant changes to the op-code structure.

According to aspects of this disclosure, transform engine 66 may include a mix of programmable and fixed function hardware processing units. For example, transform engine 66 may include one or more processing elements responsible for collecting control parameter values, setting op-code, and executing the op-code based on an order of tasks associated with the op-code. In addition, transform engine 66 may include one or more fixed function hardware units (e.g., arithmetic logic units (ALUs), ASICs, MACs, or the like) for performing transformation operations associated with transform processing unit 52, quantization unit 54, inverse quantization unit 58, or inverse transform unit 60. In this way, transform engine 66 may incorporate the flexibility of programmability (via the op-code) with the processing speed of fixed function hardware units.

Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

In this manner, video encoder 20 represents an example of a video encoder that may determine, based on variable operational code, a plurality of control parameters for transforming the video data in a transform domain, where the operational code maps each of the plurality of control parameters to respective operational code fields, and perform transformation of the video data based on the determined control parameters.

Figure 3:
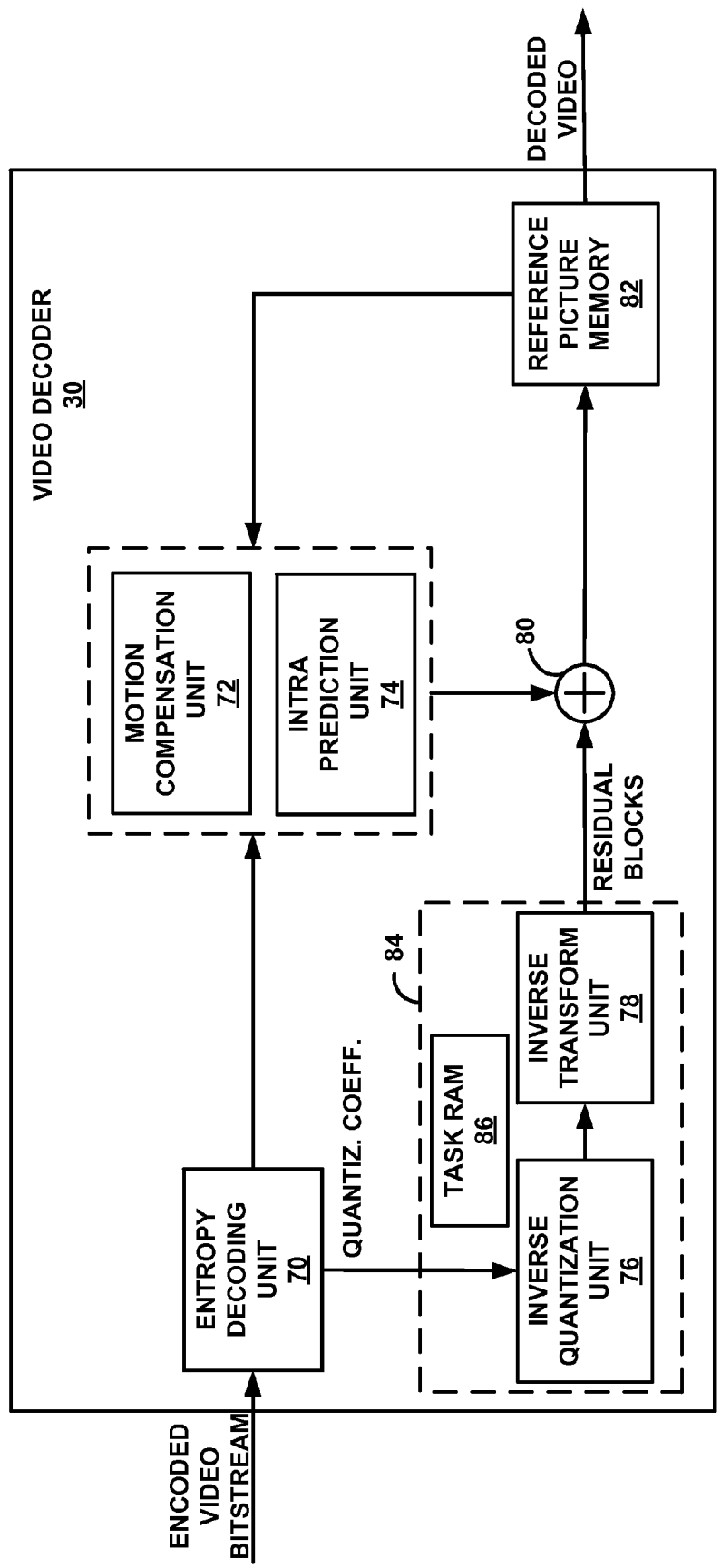
FIG. 3 is a block diagram illustrating an example video decoder that may implement the techniques of this disclosure.

FIG. 3 is a block diagram illustrating an example of video decoder 30 that may implement techniques for transformation as described in this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80.

In the example of FIG. 3, video decoder 30 also includes transform engine 84, which includes inverse quantization unit 76 and inverse transform unit 78 (illustrated using a dashed line) as well as a memory referred to as task RAM 86. Thus, while each of inverse quantization unit 76 and inverse transform unit 78 is shown as a separate unit, it should be understood that such units may be highly integrated, and may be included in the same processing unit. In other examples, transform engine 84 may include more or fewer units than those shown in FIG. 2. For example, in another example, transform engine 84 may include only inverse transform unit 78 and task RAM 86, and may be responsible for solely applying inverse transforms.

In any case, during the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current picture. When the video picture is coded as an inter-coded (i.e., B, or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

According to aspects of this disclosure, transform engine 84, shown as including inverse quantization unit 76, inverse transform unit 78, and task RAM 86 may perform similar techniques as described above with respect to transform engine 66 (FIG. 2). For example, according to aspects of this disclosure, transform engine 84 may use a variable op-code to determine control parameters for applying transforms and or quantization.

In the example of FIG. 3, transform engine 84 includes a memory, which may be referred to as task RAM 86. While illustrated as a separate memory unit in the example of FIG. 3, in other examples, task RAM 86 may be allocated in a shared memory for video decoder 30. In any case, as described in greater detail with respect to FIG. 4 below, task RAM 86 may store one or more op-codes, each of which map a plurality of control parameters to a plurality of op-code fields.

According to aspects of this disclosure, transform engine 84 may collect control parameter values as a set of op-code, setting each control parameter value as an op-code field value of the op-code. Transform engine 84 may store op-code field values to task RAM 68 in a predetermined order (e.g., transform type field, followed by transform direction field, followed by transform size field, and the like). Thus, in an example for purposes of illustration, transform engine 84 may associate the first three bits of an op-code with a particular op-code field value, the next three bits of the op-code with another op-code field value, and so on when executing an op-code. In this example, each op-code field may be associated with a predetermined position in the op-code relative to each other op-code field. In other examples, transform engine 84 may vary the ordering of op-code fields based on the data being transformed, e.g., based on the op-code fields that are needed for a particular block or slice of video data.

In some examples, transform engine 84 may organize op-codes according to a flow of operations. For example, transform engine 84 may determine a relative or absolute time at which to perform each inverse transform operation (e.g., applying an inverse transform to a block of residual data) and assign a task order to each transformation operation. In addition, transform engine 84 may generate an op-code for each inverse transformation operation and link each op-code to the appropriate task. In this way, transform engine 84 may chronologically arrange op-codes according to the time at which the op-codes are to be executed.

In some examples, transform engine 84 may use op-code field lengths (e.g., bit string lengths) that include more bits than necessary to represent control parameters of a particular standard. For example, the length of a particular op-code field may be selected to accommodate future expansion (for compliance with additional standards), but without being so long that the op-code fields become computationally burdensome. In this way, transform engine 84 is adaptable to different standards without significant changes to the op-code structure.

According to aspects of this disclosure, transform engine 84 may include a mix of programmable and fixed function processing units. For example, transform engine 84 may include one or more processing elements responsible for collecting control parameter values, setting op-code, and executing the op-code based on an order of tasks associated with the op-code. In addition, transform engine 84 may include one or more fixed function units (e.g., ALUs, ASICs, MACs, or the like) for performing transformation operations associated with inverse quantization unit 76 or inverse transform unit 78. In this way, transform engine 84 may incorporate the flexibility of programmability (via the op-code) with the processing speed of fixed function hardware units.

In any case, after motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder that may determine, based on variable operational code, a plurality of control parameters for transforming the video data in a transform domain, where the operational code maps each of the plurality of control parameters to respective operational code fields, and perform transformation of the video data based on the determined control parameters.

Figure 4:
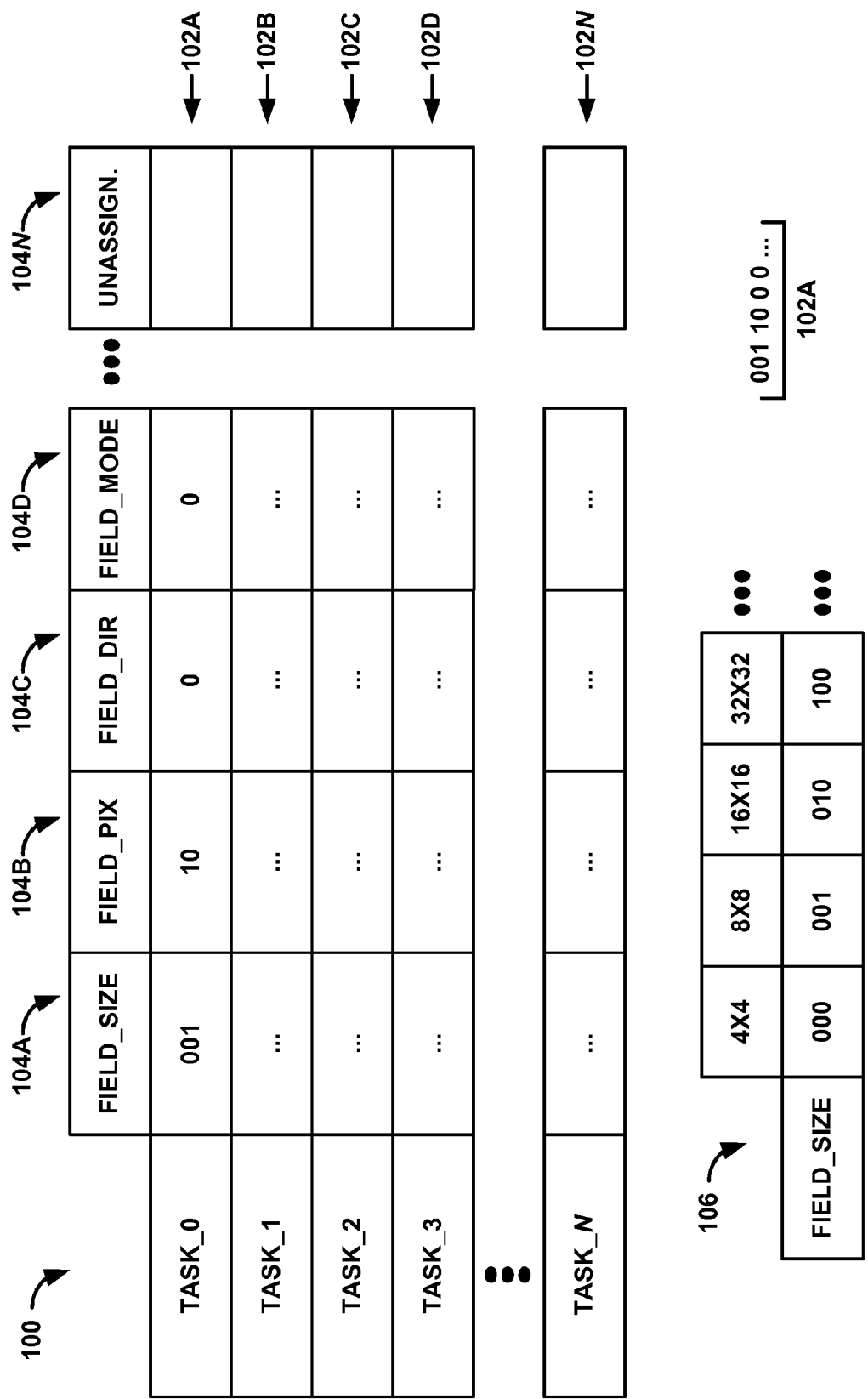
FIG. 4 is a conceptual diagram illustrating an example table for determining control parameters for performing transformation operations, according to aspects of this disclosure.

FIG. 4 is a conceptual diagram illustrating an example table for determining control parameters for performing transformation operations, according to aspects of this disclosure. For example, the example diagram of FIG. 4 illustrates a table 100 of op-codes 102A-102N (collectively op-codes 102), with each op-code 102 having a plurality of op-code fields 104A-104N (collectively op-code fields 104). In addition, each of the op-codes 102 is associated with a task (TASK_0, TASK_1, TASK_2, TASK_3, to TASK_N).

The example of FIG. 4 represents one example of op-code data that may be stored to a task memory, such as task RAM 68 or task RAM 86 of transform engine 66 and transform engine 84, respectively (FIGS. 2 and 3) and used to determine control parameters during transformation. Accordingly, while the example of FIG. 4 is described generally with respect to a transform engine, it should be understood that the techniques may be performed by video encoder 20, video decoder 30, or a variety of other processors.

A transform engine may initially collect and set control parameters as op-code field values in op-code fields 104. The transform engine may receive control data for setting the control parameters from a variety of other units of the video coder or from firmware of the video coder. The control data may indicate characteristics about the video data being transformed (such as data identifying the block to be transformed, a transform size, color space information, a prediction mode, a type of transform, a direction of a transform, a video coding standard, whether the transform engine must wait for another video coding processes to finish, or the like).

For example, table 100 includes op-code fields 104 that correspond to transform size (e.g., 2×2, 4×4, 8×8, 16×16, 32×32, or the like) (FIELD_SIZE, 102A), pixel type (e.g., luma, Cb, Cr) (FIELD_PIX, 104B), transform direction (e.g., forward or inverse) (FIELD_DIR, 104C), and prediction mode (e.g., intra-prediction or intra-prediction) (FIELD_MODE, 104D). In other examples, table 100 may include additional op-code fields not shown in FIG. 4, as represented by ellipses and unassigned op-code field (UNASSIGN, 104N). The transform engine may receive control data indicating the transform size, the transform direction, the prediction mode (as well as any other characteristics) from one or more other units of the video coder or from firmware associated with the video coder. As noted above, the transform engine may use the control data to set control parameters (that control the transformation operations) as op-code values in op-code fields 104.

The transform engine may set op-code field values of op-code fields 104 based on a predetermined assignment of control parameters to op-code field values (shown in the example of FIG. 4 with table 106). As an example, for op-code field size 104A, the transform engine may assign a 4×4 transform size control parameter an op-code field value of "000," a 8×8 transform size control parameter an op-code field value of "001," a 16×16 transform size control parameter an op-code field value of "010," and a 32×32 transform size control parameter an op-code field value of "100." Control parameters for each of the other op-code fields 104 may be assigned op-code field values in a similar manner, e.g., using any of the eight values supported by the three-bit op-code, or any of the $2^n$ values supported by an n-bit op-code, in the case of opcodes with different lengths.

According to aspects of this disclosure, op-code field lengths (e.g., bit string lengths) for each op-code field 104 may be selected to allow for expansion for changing and/or new standards. That is, while two bits may be sufficient to represent a control parameter for a particular standard, an op-code field may be three bits in length to accommodate other standards.

As shown in table 100, the transform engine may arrange op-codes 102 according to an operational flow of transformation operations. For example, a scheduler of the transform engine may schedule transformation operations, referred to in the example of FIG. 4 as tasks, based on a relative or absolute time at which each operation is to be executed. Thus, in some instances, the tasks may be referred to as being associated with a particular timestamp. In any case, the transform engine may link each of the op-codes 102 to a particular task, and organize the tasks according to an order in which the tasks are to be executed.

In an example for purposes of illustration, TASK_0 may be associated with applying a forward transform to a first block residual data, TASK_1 may be associated with quantizing the transformed residual data from TASK_0, and TASK_2 may be associated with applying a forward transform to a second, different block of residual data. Accordingly, in some examples, the transform engine arranges the op-codes 102 in chronological order according to the respective times at which the op-codes 102 are to be executed.

The transform engine may execute op-codes 102 to determine control parameters when performing transformation operations. As an example, upon executing op-code 102A associated with TASK_0, the transform engine determines that the block size of the block being transformed is 8×8

(op-code field 104A "001"). In addition, the transform engine determines the control parameters associated mapped to op-code fields 104B-104N based on the respective op-code field values. In this way, the operations of the transform engine, e.g., residual generation, transformation, quantization, inverse quantization, inverse transformation, reconstruction (which may be executed using fixed function hardware units) may be scheduled and executed based on table 100.

The transform engine may load and/or update table 100 relatively easily, and without changes to hardware of the transform engine. For example, as noted above, table 100 and the associated mapping of control parameters to op-code field values may be stored to a programmable task RAM. In other examples, at least a portion of table 100 and/or the mapping of control parameters to op-code field values may be stored to a read-only memory, including, as an example, a LUT. Each approach may provide a trade-off in terms of flexibility and speed. For example, a task RAM may provide greater configurability than a LUT, but may also be relatively slower and/or more costly to implement. In contrast, a LUT may provide greater speed and/or be less costly to implement, but may require changing and/or replacing the entire LUT to implement changes.

In either case, the techniques provide a flexible approach to control parameters in a transform engine that may be changed and/or expanded (e.g., using op-code field 104N). The techniques may also decrease costs associated with design and verification of the transform engine. For example, if an error is detected during a design phase, the contents and mappings of table 100 are relatively easy to modify.

Figure 5:
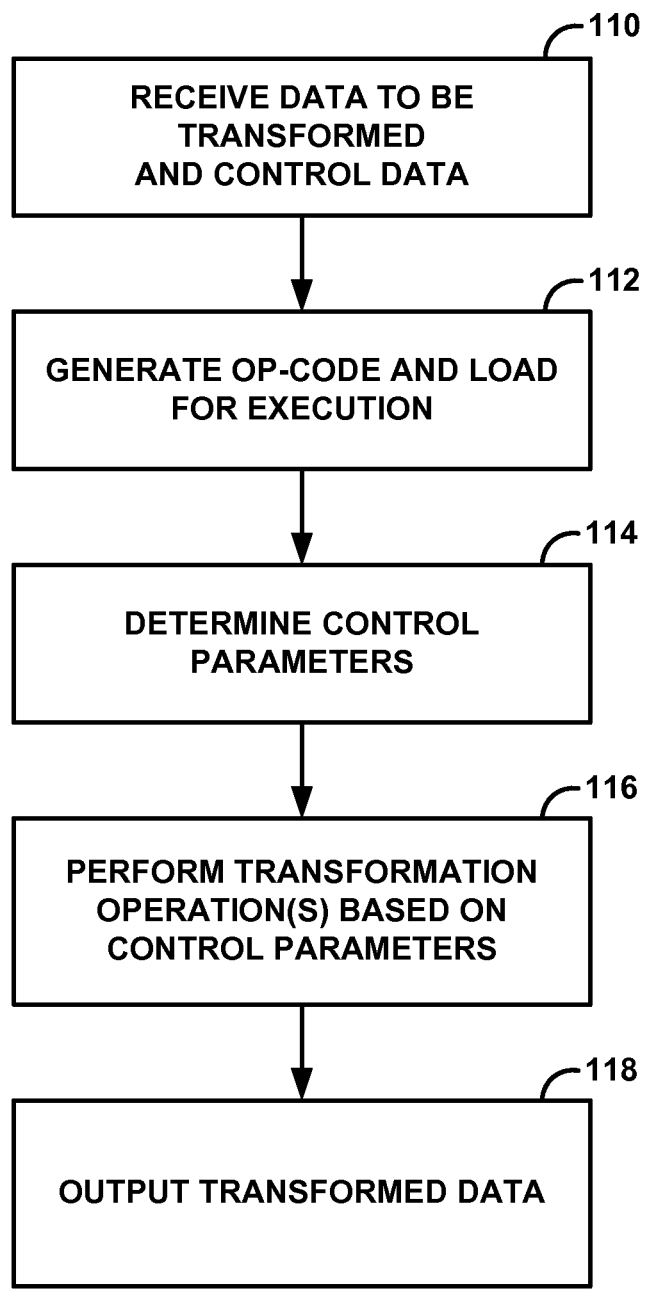
FIG. 5 is a flow diagram illustrating an example process for transforming video data in video coding, according to aspects of this disclosure.

FIG. 5 is a flow diagram illustrating an example process for transforming residual data in video coding, according to the techniques of this disclosure. The example shown in FIG. 5 is generally described as being performed by a video coder. It should be understood that, in some examples, the process of FIG. 5 may be carried out by video encoder 20, video decoder 30, or a variety of other processors, processing units, hardware-based coding units such as encoder/decoders (CODECs), and the like.

In the example of FIG. 5, one or more units of a video coder (e.g., such as video encoder 20 or video decoder 30) responsible for performing transformation (referred to generally as a "transform engine") may receive video data to be transformed and control data (110). For example, the transform engine may receive a block of residual video data to be transformed into a plurality of transform coefficients. In another example, the transform engine may receive a block of transform coefficients to be transformed into reconstructed residual data.

In addition, the transform engine may receive control data from one or more other units of the video coder and/or firmware associated with the video coder. For example, the transform engine may receive control data from a motion estimation or compensation unit, a prediction unit (such as an intra-prediction unit), or variety of other units of the video coder. The control data may indicate characteristics about the video data being transformed (such as data identifying the block to be transformed, a transform size, color space information, a prediction mode, a type of transform, a direction of a transform, a video coding standard, whether the transform engine must wait for another video coding processes to finish, or the like).

The transform engine may then generate op-code based on the received control data and load the op-code for execution (112). For example, the transform engine may determine op-code that maps control parameters (as indicated by the received control data) to op-code fields, as described, for example, with respect to FIG. 4 above. The transform engine may generate one or more op-codes for each transformation operation (e.g., forward transformation, inverse transformation, or the like), which may be referred to as a task. The transform engine may load the op-code for execution according to an order in which the tasks are to be executed.

The transform engine may then determine control parameters for the transformation operation (114). For example, the video coder may determine the control parameters based on the control data associated with the data to be transformed. According to aspects of this disclosure, as described above, the transform engine may determine the control parameters using op-code that maps the control parameters to op-code fields. That is, for example, each of the control parameters for the transformation operation may be assigned op-code field values of an op-code, where each of the op-code field values indicates a particular control parameter. Accordingly, in some instances, the variable op-code may correspond to programmable values of a task memory (such as table 100 shown in FIG. 4).

The transform engine may then perform the transformation operation (or more than one transform operation, if applicable based on the op-code) based on the determined control parameters (116). As described above, the op-code may be chronologically organized according to an order in which tasks associated with the op-code are to be executed. Accordingly, performing the transformation operation may include executing the task to which the op-code belongs.

The transform engine may then output the transformed data (118). For example, the transform engine may pass the transformed data (e.g., transform coefficients or reconstructed residual data) to another unit of the video coder.

Figure 6:
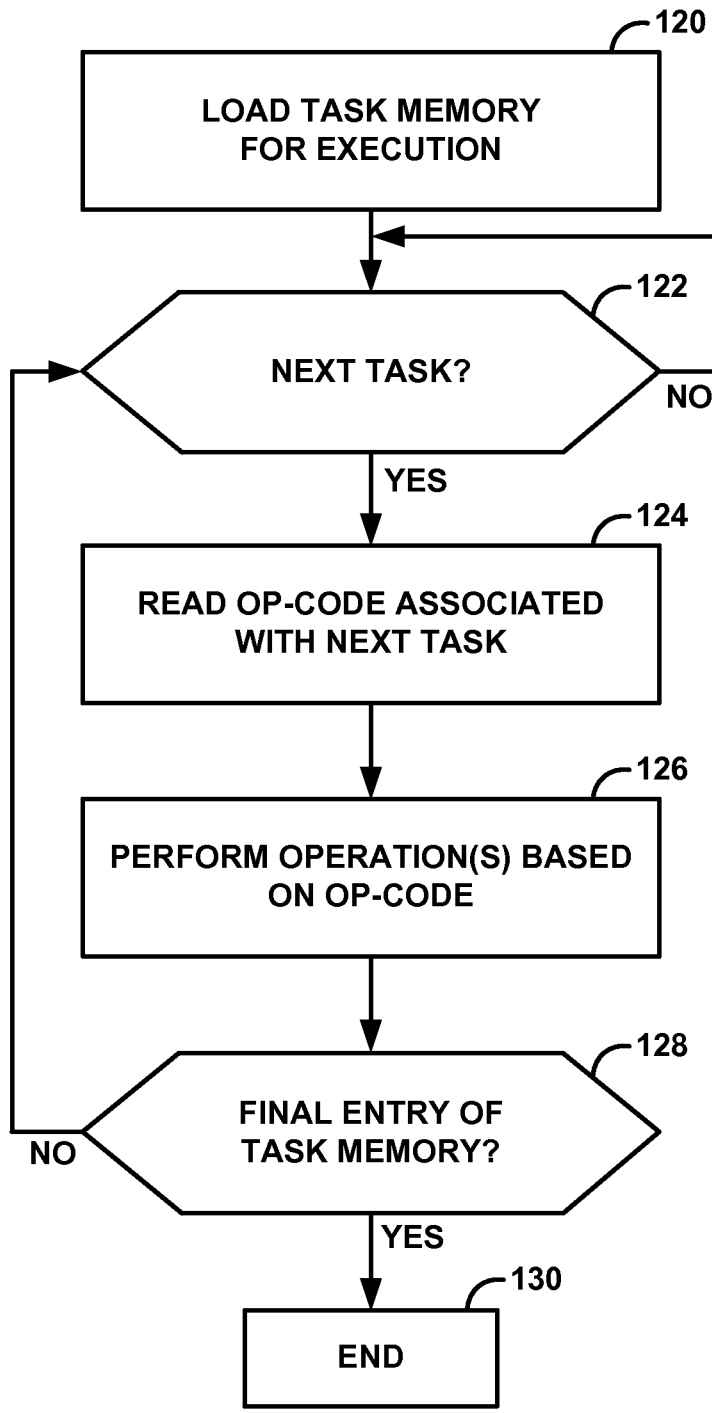
FIG. 6 is a flow diagram illustrating another example process for transforming video data in video coding, according to aspects of this disclosure.

FIG. 6 is a flow diagram illustrating an example process for transforming residual data in video coding, according to the techniques of this disclosure. The example shown in FIG. 6 is generally described as being performed by a video coder. It should be understood that, in some examples, the process of FIG. 6 may be carried out by video encoder 20, video decoder 30, or a variety of other processors, processing units, hardware-based coding units such as encoder/decoders (CODECs), and the like.

In some examples, the process shown in FIG. 6 may form a portion of the process shown in FIG. 5. For example, the process shown in FIG. 6 may form at least a portion of steps 112 and 114 of FIG. 5.

In any case, in the example of FIG. 6, one or more units of a video coder (e.g., such as video encoder 20 or video decoder 30) responsible for performing transformation (referred to generally as a "transform engine") may load a task memory for execution (120). The task memory may include a plurality of op-codes assigned to operational tasks, where each of the op-codes maps a plurality of control parameters to respective op-code fields.

The transform engine may then determine whether to execute the next task (122). In some instances, the transform engine may determine when to execute the next task based on the duration of the previous task, receiving a flag that the previous task is complete, or the like. When it is time to execute the next task, the transform engine may read the op-code associated with the next task (124). As noted above, the op-code may provide an indication of the control parameters necessary for carrying out the task. That is, the op-code may map each of a plurality of control parameters to respective op-code fields.

The transform engine may then perform the operations associated with the task based on the op-code (126). That is, the transform engine may perform the operations based on the control parameters (e.g., data identifying the block to be transformed, a transform size, color space information, a prediction mode, a type of transform, a direction of a transform, a video coding standard, whether the transform engine must wait for another video coding processes to finish, or the like) indicated by the op-code.

The transform engine may then determine whether the previously executed task is the final entry of the task memory (128). If so, the transform engine may end the process (130). If the previously executed task is not the final entry of the task memory, the transform engine may return to step 122 and execute the next task.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Certain aspects of this disclosure have been described with respect to the developing HEVC standard for purposes of illustration. However, the techniques described in this disclosure may be useful for other video coding processes, such as those defined according to H.264 or other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of transforming video data, the method comprising:
    receiving, by a programmable processing unit of a transform engine, control data indicating characteristics of the video data;
    generating, by the programmable processing unit of the transform engine, based on the control data, an operational code associated with a task, the operational code including a plurality of operational code fields, each respective operational code field of the plurality of operational code fields having a respective operational code field value in a plurality of operational code field values, wherein generating the operational code comprises:
        setting, based on the control data, a plurality of control parameters; and
        setting the operational code field values of the operational code based on a predetermined assignment of the control parameters to the operational code field values;
    storing, by the programmable processing unit of the transform engine, the operational code in a memory; and
    when a time has arrived for executing the task:
        reading, by the programmable processing unit of the transform engine, the operational code from the memory;
        for each respective control parameter of the plurality of control parameters, determining, by the programmable processing unit of the transform engine, the respective control parameter from a respective operational code field value in the operational code, wherein each respective control parameter of the plurality of control parameters indicates a respective characteristic of the video data; and
        performing, by a fixed-function hardware unit of the transform engine, a transformation operation based on the determined control parameters to transform coefficients from a frequency domain to pixel difference values in a spatial domain, the fixed-function hardware unit comprising at least one item that transforms the video data selected from among: an application-specific integrated circuit, an arithmetic logic unit, and a multiply-accumulate unit, and wherein the plurality of operational code fields are changeable to accommodate a plurality of video coding standards without changing any hardware of the transform engine.

2. The method of claim 1, wherein the plurality of control parameters includes more than one of a transform size, a color space of the video data, a prediction mode associated with the video data, a transform type, and a transform direction.

3. The method of claim 1, further comprising:
    organizing a plurality of operational codes according to an order in which a plurality of tasks to which the operational codes correspond are executed.

4. The method of claim 3, wherein organizing the plurality of operational codes comprises storing the operational codes to the memory in chronological order based on the order in which the tasks are executed.

5. The method of claim 1, wherein each operational code field of the plurality of operational code fields is associated with a predetermined number of bits of the operational code.

6. The method of claim 5, wherein each operational code field of the plurality of operational code fields is associated with a predetermined position in the operational code relative to each other operational code field of the plurality of operational code fields.

7. An apparatus for transforming video data, the apparatus comprising a memory and a transform engine, the transform engine comprising a programmable processing unit and a fixed-function hardware unit, the programmable processing unit configured to:
    receive control data indicating characteristics of the video data;
    generate, based on the control data, an operational code associated with a task, the operational code including a plurality of operational code fields, each respective operational code field of the plurality of operational code fields having a respective operational code field value in a plurality of operational code field values, wherein the programmable processing unit is configured such that, as part of generating the operational code, the programmable processing unit:
        sets, based on the control data, a plurality of control parameters; and
        sets the operational code field values of the operational code based on a predetermined assignment of the control parameters to the operational code field values;

store the operational code in the memory; and
when a time has arrived for executing the task:
  read the operational code from the memory; and
  for each respective control parameter of the plurality of control parameters, determine the respective control parameter from a respective operational code field value in the operational code, wherein each respective control parameter of the plurality of control parameters indicates a respective characteristic of the video data,
wherein the fixed-function hardware unit is configured to perform a transformation operation based on the determined control parameters to transform coefficients from a frequency domain to pixel difference values in a spatial domain, the fixed-function hardware unit comprising at least one item that transforms the video data selected from among: an application-specific integrated circuit, an arithmetic logic unit, and a multiply-accumulate unit, and wherein the plurality of operational code fields are changeable to accommodate a plurality of video coding standards without changing any hardware of the transform engine.

8. The apparatus of claim 7, wherein the plurality of control parameters includes more than one of a transform size, a color space of the video data, a prediction mode associated with the video data, a transform type, and a transform direction.

9. The apparatus of claim 7, wherein the programmable processing unit is configured to organize a plurality of operational codes according to an order in which a plurality of tasks to which the operational codes correspond are executed.

10. The apparatus of claim 7, wherein each operational code field of the plurality of operational code fields is associated with a predetermined position in the operational code relative to each other operational code field of the plurality of operational code fields.

11. A non-transitory computer-readable medium storing instructions that, when executed, cause a programmable processing unit of a transform engine to:
  receive control data indicating characteristics of video data;
  generate, based on the control data, an operational code associated with a task, the operational code including a plurality of operational code fields, each respective operational code field of the plurality of operational code fields having a respective operational code field value in a plurality of operational code field values, wherein as part of causing the programmable processing unit to generate the operational code, the instructions cause the programmable processing unit to:
    set, based on the control data, a plurality of control parameters; and
    set the operational code field values of the operational code based on a predetermined assignment of the control parameters to the operational code field values;
  store the operational code in the memory; and
  when a time has arrived for executing the task:
    read the operational code from the memory; and
    for each respective control parameter of the plurality of control parameters, determine the respective control parameter from a respective operational code field value in the operational code, wherein each respective control parameter of the plurality of control parameters indicates a respective characteristic of the video data; and
wherein the instructions, when executed, cause a fixed-function hardware unit of the transform engine to perform a transformation operation based on the determined control parameters to transform coefficients from a frequency domain to pixel difference values in a spatial domain, the fixed-function hardware unit comprising at least one item that transforms the video data selected from among: an application-specific integrated circuit, an arithmetic logic unit, and a multiply-accumulate unit, and wherein the plurality of operational code fields are changeable to accommodate a plurality of video coding standards without changing any hardware of the transform engine.

12. The non-transitory computer-readable medium of claim 11, wherein the instructions cause the programmable processing unit to organize a plurality of operational codes according to an order in which a plurality of tasks to which the operational codes correspond are executed.

13. The non-transitory computer-readable medium of claim 11, wherein each operational code field of the plurality of operational code fields is associated with a predetermined position in the operational code relative to each other operational code field of the plurality of operational code fields.

14. The method of claim 1, wherein the plurality of operational code fields is changeable to accommodate a plurality of video coding standards without changing any hardware of the transform engine.

15. The apparatus of claim 7, wherein the plurality of operational code fields is changeable to accommodate a plurality of video coding standards without changing any hardware of the transform engine.

16. The non-transitory computer-readable medium of claim 11, wherein the plurality of operational code fields is changeable to accommodate a plurality of video coding standards without changing any hardware of the transform engine.

* * * * *